United States Patent
Dölle et al.

(10) Patent No.: US 6,674,817 B1
(45) Date of Patent: Jan. 6, 2004

(54) COMMUNICATION DEVICE AND DISTINGUISHING METHOD FOR DISTINGUISHING BETWEEN DIFFERENT DATA BURST TYPES IN A DIGITAL TELECOMMUNICATION SYSTEM

(75) Inventors: Thomas Dölle, Stuttgart (DE); Ralf Böhnke, Esslingen (DE); Tino Konschak, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/545,759

(22) Filed: Apr. 10, 2000

(30) Foreign Application Priority Data

Apr. 12, 1999 (EP) .............................. 99107118

(51) Int. Cl.⁷ .......................... H03D 1/00; H04L 27/06
(52) U.S. Cl. ...................................... 375/342; 375/343
(58) Field of Search .......................... 375/142, 150, 375/324, 340, 342, 343, 316, 354, 364, 365, 368; 455/422.1, 500, 507, 526; 370/314, 321, 326, 337, 347, 349, 350, 522

(56) References Cited

U.S. PATENT DOCUMENTS 5,905,733 A * 5/1999 Solve et al. ................ 370/522
6,069,913 A * 5/2000 Suominen ................... 375/147
6,263,031 B1 * 7/2001 Beidas et al. ............... 375/343
6,553,065 B1 * 4/2003 Tuutijarvi ................... 375/224

FOREIGN PATENT DOCUMENTS

| EP | 0 715 421 | 6/1996 |
|----|-----------|--------|
| EP | 0 767 557 | 4/1997 |
| WO | WO 98 01959 | 1/1998 |
| WO | WO 98 25356 | 6/1998 |

* cited by examiner

Primary Examiner—Betsy L. Deppe
(74) Attorney, Agent, or Firm—Frommer Lawrence & Haug LLP; William S. Frommer

(57) ABSTRACT

A communication device for transmitting and receiving control and user data bursts in a digital telecommunication system. Data bursts including bursts of a first type and bursts of a second type different from the first type, are received, with the first type bursts comprising a first training sequence and the second type bursts comprising a second training sequence, Data of the received data bursts are auto-correlated; and the type of a received data burst is recognized on the basis of a phase value of the auto-correlation result of the training sequence of the data burst.

13 Claims, 3 Drawing Sheets

COMMUNICATION DEVICE AND DISTINGUISHING METHOD FOR DISTINGUISHING BETWEEN DIFFERENT DATA BURST TYPES IN A DIGITAL TELECOMMUNICATION SYSTEM

BACKGROUND OF THE INVENTION

The present invention relates to a communication device for transmitting and receiving control and user data bursts in a digital telecommunication system and to a method for distinguishing between data bursts of a first type transmitted from a first communication device and data bursts of a second type different from said first type transmitted from a second communication device in a digital telecommunication system. The communication device of the present invention can be a base station or a mobile terminal of the telecommunication system. The first communication device and the second communication device can be a base station and a mobile terminal, respectively, or two mobile terminals directly communicating with each other. The present invention particularly enables the distinction of the traffic direction of received data bursts.

DESCRIPTION OF RELATED ART

In a digital radio telecommunication system, one base station usually serves and communicates with several mobile terminals or user equipment terminals in predetermined cells. The transmission of data from the base station to the mobile terminals is called downlink and the transmission of data from the mobile terminals to the base station is called uplink. In some telecommunication systems, a direct communication of data bursts between the mobile terminals is possible. The data, which can be either control data or user data, e. g. speech data, are transmitted in data bursts. For the transmission of data bursts, several transmission channels are defined. The transmission channels depend on the particular telecommunication system in use. In each telecommunication system, however, transmission channels for the transmission of synchronization data, control data and user data are necessary. By means of the synchronization data, the mobile terminals synchronize their time frames to the timing of the base stations. The control data channels are e. g. used by the base stations to transmit broadcast control data to all mobile terminals in the respective cell. The synchronization channel can be part of a control channel, for example the broadcast control channel. The data channels are used by the mobile terminals to transmit user data to the base stations and by the base stations to transmit user data to the mobile terminals.

An example of the time frame structure of a media access control channel (MAC) comprising the most common channels is shown in FIG. 1. The MAC frame structure shown in FIG. 1 comprises a control channel, e. g. a broadcast control channel (BCCH) used by the base stations to broadcast control data to all mobile terminals in the respective cells, traffic channels for uplink or downlink transmission of user data and a random access channel (RACH). The random access channel is used by the mobile terminals to transmit service requests to the base stations. E. g. if a mobile terminal needs a user data channel for transmitting user data to a base station, the mobile terminal sends a service request via the random access channel to the base station. The base station receiving the service request answers the request by sending a corresponding grant or refusal message back to the mobile terminal.

As shown in FIG. 1, the different channels comprise training sequences, preambles and/or headers. Training sequences or synchronization headers are mainly used for an accurate synchronization of the receiving unit, i. e. a base station or a mobile terminal receiving data bursts on a transmission channel to enable a reliable reception and use of the transmitted data. E. g., a training sequence consists of a predetermined number of repetition patterns or symbols, whereby each symbol consists of a certain number of samples. Typically, all symbols or repetition patterns in a given training sequence are identical, i.e. have the same shape or content.

Looking at the example of the GSM-system (global system for mobile communications), the normal user data bursts, the synchronization bursts and the random access bursts each comprise a training sequence. In the normal user data burst, the training sequence is located in the middle of a time slot and comprises 26 bits. In a synchronization burst the training sequence is also located in the middle of a time slot, but comprises 64 data bits. In a random access burst, the training sequence is located in the front part of the time slot and comprises 41 bits. In this case, a communication device receiving different types of data bursts can easily distinguish the different types of data bursts by their different training sequences and downlink and uplink data bursts can be recognized without problems. A mobile terminal therefore can distinguish easily between a broadcast control data burst broadcast from a base station to all mobile terminals in the corresponding cell and user data bursts or random access bursts transmitted from other mobile terminals to the base station. However, the use of training sequences of different length or shapes for the different types of data bursts requires a complex detector structure in the receiving unit, because the receiving unit has to deal with many different types of training sequences.

Depending on the multiple access scheme used in the telecommunication system, e. g. frequency division multiple access, time division multiple access or code division multiple access, a mobile terminal may have other criteria, e. g. frequency or code, available to distinguish if the data bursts have been transmit from a base station or from other mobile terminals. In this case, even the use of identical training sequences in the different types of data bursts may be possible. However, if no other criteria are available, as e. g. in a time division duplex mode (TDD mode), in which the same carrier frequency is used, a mobile terminal cannot distinguish if the data bursts are coming from a base station of from other mobile terminals when identical training sequences are used in the different data bursts.

SUMMARY OF THE INVENTION

The object of the present invention is therefore to provide a communication device for transmitting and receiving control and user data bursts in a digital telecommunication system, which is able to distinguish between different types of data bursts in an easy and simple way. The object of the present invention is further to provide a method for distinguishing between data bursts of first type transmitted from a first communication device and data bursts of a second type different from said first type transmitted from a second communication device in a digital telecommunication system.

The above object is achieved by a communication device for transmitting and receiving control and user data bursts in a digital telecommunication system according to claim 1, which comprises receiving means for receiving data bursts including data bursts of a first type and data bursts of a second type different from said first type, said first type bursts respectively comprising a first training sequence and said second type bursts respectively comprising a second training sequence. The communication device further comprises correlation means for auto-correlating the data of received data bursts and outputting an auto-correlation result and recognizing means for recognizing the type of a received data burst on the basis of a phase value of the auto-correlation result of the training sequence of said burst. A communication device of the present invention can be a mobile terminal or a base station of the telecommunication system.

The above object is further achieved by a method for distinguishing between data bursts of a first type transmitted from a first communication device and data bursts of a second type different from said first type transmitted from a second communication device in a digital telecommunication system, said first type data bursts respectively comprising a first training sequence and said second type data bursts respectively comprising a second training sequence, which comprises the steps of receiving a data burst, auto-correlating the data of said received data burst and outputting an auto-correlation result and recognizing the type of the received data burst on the basis of a phase value of the auto-correlation result of the training sequence of said data burst. The first communication device can be a base station and the second communication device can be a mobile terminal of the telecommunication system. Alternatively, the first communication device as well as the second communication device can be mobile terminals of the telecommunication system.

The communication device and the distinguishing method of the present invention particularly enable the distinction between different traffic directions. Thereby, a receiving communication device is able to distinguish if a received data burst is of interest or not.

The present invention thus enables the use of training sequences with very similar shapes in the different types of data bursts used for different traffic directions, e. g. for the uplink and the downlink in the telecommunication system, so that the general structure of the communication devices in the telecommunication system is significantly simplified. Particularly, very similar structures for generating the training sequences on the transmitter side and for correlating the received training sequences on the receiver side in the different communication devices can be provided. Further, a single detecting or recognizing structure can be used in the communication device for all different types of data bursts. Thus, the communication devices can be built in a simple and cost-effective way.

The training sequences of different types of bursts can be formed with a very similar content or shape, but have to result in different phase values at the output of the auto-correlation means on the receiving side so that the different types of data bursts can be distinguished. Thus, the communication device of the present invention is able to distinguish between different types of data bursts in a simple and easy way.

The training sequences used in the different types of data bursts can but do not need to have an identical length as long as they result in a different phase information in the auto-correlation result on the receiver side. Thus, the content and the length of the different training sequences used in the different types of data bursts can be different from each other. If, e. g. the first training sequence has a length of 8 symbols and the second training sequence has a length of 6 symbols, whereby each symbol has the same number of samples, the amplitude of the auto-correlation peak might be different. However, the important characteristic for the present invention is that the phase information of the auto-correlation result for the two training sequences is different so that the different types of data bursts can be distinguished. Even when the training sequences have different length, the same auto-correlator structure on the receiver side can be used.

The present invention presents the concept of a digital telecommunication system, in which the base stations transmit data bursts of a first type including a first training sequence and the mobile terminals transmit data bursts of a second type including a second training sequence or vice versa. In other words, the base stations advantageously transmit the same first (or second) training sequence in all the different data bursts having a training sequence and the mobile terminals similarly transmit the same second (or first) training sequence in all their data bursts having a training sequence. Alternatively or additionally, different mobile terminals of the telecommunication system can transmit data bursts having respective different training sequences. E. g. a first mobile terminal may transmit data bursts of a first type including a first training sequence and a second mobile terminal may transmit data bursts of a second type including a second training sequence. Thus, a receiving device, as e. g. a base station or a mobile terminal, is able to distinguish the traffic direction of received data bursts. Thereby, the first training sequences and the second training sequences are different from each other, but have a very similar shape. The shape of the first and the second training sequences, respectively, are chosen so that the result of an auto-correlation procedure on the receiver side shows different phase values for the first and the second training sequence, respectively, so that they can be clearly distinguished. Thus unnecessary processing and energy waste in the receiving communication device can be avoided on the basis of the distinction if the received data burst is of interest or not.

Advantageously, the recognizing means of the communication device according to the present invention comprises means for detecting the phase of the auto-correlation result of the training sequence. In this case, the recognizing means can further comprise means for comparing the detected phase with a predetermined phase threshold to recognize the type of the received data burst. This first alternative enables a very accurate phase determination, which can be further used for the calculation of an accurate value of the frequency offset of the transmitted data bursts.

In a second alternative, the recognizing means advantageously comprises means for detecting the sign value of the real part of the auto-correlation result of the training sequence and means for determining the type of the received data burst on the basis of said sign value. This second alternative enables a very simple structure of the recognizing means, since only the sign value has to be looked at.

Further advantageously, in said first training sequence every symbol or pattern is inverted in relation to the respective preceding symbol or pattern but not in said second training sequence, so that the different phase characteristics of the respective auto-correlation results enable a simple recognition of the type of the received data burst. Typically, the samples of the symbols of the training sequences are complex values, so that inverting one symbol in relation to another symbol means that the samples of the one symbol are the negative complex values of the samples of the other symbol. The content, i. e. the absolute values, of the samples and thus the symbols of the different data bursts can be the same or different for the different data burst types.

Further advantageously, all symbols of said first and second training sequence respectively consist of the same number of samples and have an identical absolute value. This greatly simplifies the general design of the communication devices, since all devices can be built with almost the same generating and receiving means for the training sequences. Although the first and second training sequences differ very little from each other, the auto-correlation result gives different phase values for the first and the second training sequence, respectively, so that a clear distinction between the different data burst types is possible.

Advantageously, the communication device according to the present invention is a mobile terminal of the telecommunication system. Thereby, the first type burst is a downlink data burst from a base station and the second type burst is an uplink data burst from another mobile terminal.

BRIEF DESCRIPTION OF THE DRAWINGS

The present invention is explained in more detail in the following description by means of preferred embodiments relating to the enclosed drawings, in which.

DETAILED DESCRIPTION OF PREFERRED EMBODIMENTS

Figure 1:
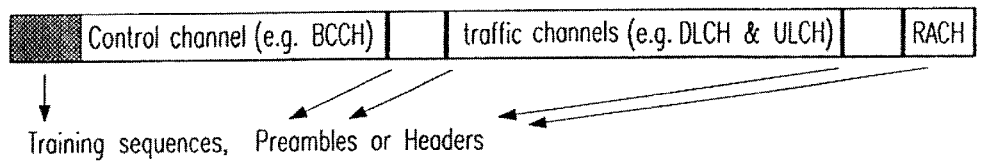
FIG. 1 shows an example of a time frame structure of a media access control channel.
Figure 2:
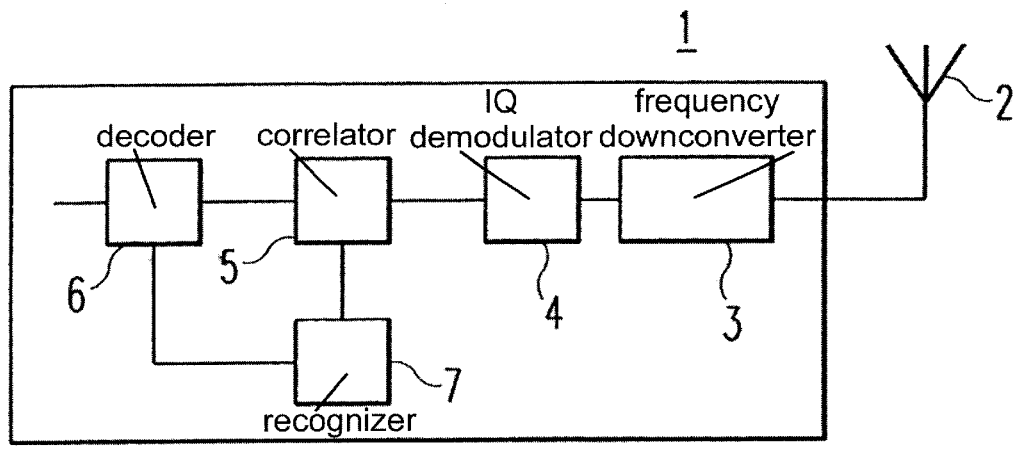
FIG. 2 shows a basic structure of a communication device according to the present invention.

In FIG. 2, the general structure of a communication device 1 for transmitting and receiving control and user data bursts in a digital telecommunication system according to the present invention is shown. The communication device 1 can be a mobile terminal or a base station or part of a mobile terminal or a base station of the telecommunication system. The communication device 1 comprises an antenna 2 for receiving data bursts from a transmitting side, e. g. a base station of the telecommunication system. The received data bursts are supplied to a high frequency means 3, which downconverts the received high frequency bursts into base band signals. The downconverted signals are supplied to a IQ-demodulation means 4, where they are demodulated to derive a data sequence and supplied to a correlation means 5 for auto-correlating the data. After the auto-correlation, the auto-correlation result is supplied to a recognizing means 7 for recognizing the type of the received data bursts on the basis of a phase value of the auto-correlation result of the training sequence of the data burst. The information on the type of the received data burst can e. g. be used for the decision, if further processing, e. g. in a decoding means 6 is performed or not. It is to be understood, that the communication device 1 shown in FIG. 2 only shows very generally the important parts in view of the present invention, but comprises all further necessary elements for transmitting and receiving information in the telecommunication system, transforming received data bursts into visible or audible signals for a user and transforming speech or write data into data bursts to be transmitted to another communication device.

The communication device 1 according to the present invention is able to distinguish between first type data bursts and second type data bursts different from said first type data bursts by processing the auto-correlation result of the first training sequence of the first type data bursts and the second training sequence of the second type data bursts, respectively. In case that the first type data bursts are transmitted from a base station and the second type data bursts are transmitted from a mobile terminal of the telecommunication system, the communication device 1 therefore is able to distinguish between uplink and downlink data bursts and to decide upon the further processing of the received data bursts on the basis of this distinction. In case that the first type data bursts are transmitted from a first mobile terminal and the second type data bursts are transmitted from a second mobile terminal of the telecommunication system, the communication device 1 therefore is able to distinguish between data bursts coming from the first mobile terminal and data bursts coming from the second mobile terminal, respectively, and to decide upon the further processing of the received data bursts on the basis of this distinction.

Figure 3:
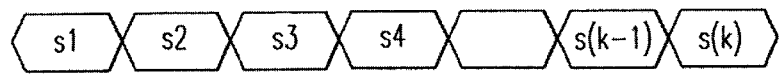
FIG. 3 shows the basic structure of a training sequence according to the present invention.

The general structure of the first and the second training sequences according to the present invention is shown in FIG. 3. The first and second training sequences may have the same length, i. e. the same number of patterns or symbols s1, s2, . . . , s(k−1), s(k), whereby each symbol consists of the same number of samples. The symbols of the first training sequence are identical to each other, i.e. have the same sample sequence. The following equation is valid for the symbols and thus for the samples of the first training sequence:

$$S_k(t) = S_{k-1}(t)$$

whereby $0 \leq k \leq K$ and $0 \leq t \leq T$. K is the total number of symbols within the training sequence, T is the duration or length of one symbol and t can be regarded as the time or the sample number. It is to be noted, that the samples have complex values.

In the second training sequence, every symbol is inverted in relation to the preceding symbol. The symbols of the second training sequence have the same absolute values, e.g. the first, second, third etc. samples of the respective symbols have the same absolute values. The following equation is therefore valid for the symbols and thus for the samples of the second training sequence:

$$S_k(t) = -S_{k-1}(t)$$

whereby $0 \leq k \leq K$ and $0 \leq t \leq T$. K is the total number of the symbols within the second training sequence, T is the duration or length of one symbol and t can be regarded as the time or the sample number. The second training sequence can, but does not need to have the same length or number of symbols as the first training sequence and the same duration or number of samples within the symbols as the first training sequence. The content, i. e. the absolute values of the symbols of the first and the second training sequence are identical, whereby every symbol of the second training sequence is inverted in relation to the preceding symbol, which means that every first, second, third etc. sample of the one symbol is the negative value of the respective first, second, third etc. sample of the preceding symbol. The symbols of the first training sequence are not inverted in relation to each other. By inverting the symbols of the second training sequence in this way, a different phase behaviour for the first and second training sequence can be obtained in the auto-correlation procedure performed in the recognizing means 7, so that first and second training sequences and therefore first type and second type data bursts can be distinguished from each other.

It is to be noted, that the present invention is not limited to the above described inversion of the symbols in the second training sequence, but it is also possible to invert only every third, fourth and so on symbol or only one or two symbols of the second training sequence in relation to the corresponding samples of the first training sequence as long as a phase difference of the auto-correlation result of the first and the second training sequence is obtained. Further, all the symbols of the first and the second training sequence do not necessarily need to have the same absolute values. However, if all symbols of the first and the second training sequences have the same absolute values, the generating and transmitting structures on the transmitter side can be used in all communication devices of the telecommunication system, whereby only slight modifications are necessary for the different types. The receiving and recognizing structures on the receiving side, as e.g. the correlation means 5 and the recognizing means 7 of the communication device 1 of the present invention can be used in all communication devices of the system since they are able to process training sequences of different lengths. If e.g. a first training sequence having a length of 8 symbols and a second training sequence having a length of 6 symbols are received, both training sequences are processed in the same way by the correlation means 5, whereby the amplitude of the correlation peak and the position of the correlation peak may be different. However, the recognizing means 7 is still able to distinguish the first and the second training sequence on the basis of the phase information of the auto-correlation result.

Figure 4:
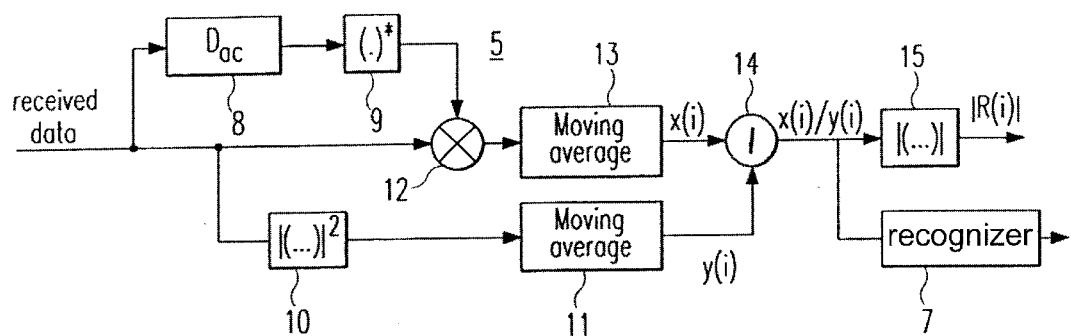
FIG. 4 shows the general structure of an auto-correlation means and a recognizing means, which can be used in a communication device as shown in FIG. 2.

FIG. 4 shows a more detailed example of the correlation means 5 for auto-correlating received data bursts of the communication device 1 according to the present invention. The received data bursts are processed by the IQ-demodulation means 4 and the corresponding output data are supplied to the correlation means 5 in form of data samples. In the correlation means 5, the samples are supplied to a delay means 8 for delaying the samples by a factor $D_{ac}$ and supplied to a means 9 for calculating the conjugate complex value of the data. The conjugate complex data samples output from the means 9 are multiplied with the received data samples in a multiplier 12. If e.g. the delay means 8 delays the received data by one sample, so that the conjugate complex value of each preceding sample is multiplied with the succeeding sample in the multiplier 12. The multiplication product output from the multiplier 12 is then supplied to a moving average means 13 calculating the moving average values within a window of size W. Further, the square absolute value of the received data is calculated in a corresponding calculation means 10 and then supplied to a moving average means 11, which performs a moving average calculation within the same window of size W.

The divider 14 divides the output from the moving average means 13 by the output of the moving average means 11, so that a normalized value x(i)/y(i) is obtained, which is the auto-correlation result. The output from the divider 14 can then be further processed for a threshold detection and/or a maximum search to find the correct correlation peak, e. g. using an absolute value means 15 for calculating the absolute value of the normalized output of the divider 14 and/or further necessary means. The output of the absolute value means 15 shows an auto-correlation peak, e. g. at the end of the training sequence, which can be used by the communication device 1 to find the correct timing and to get synchronized to other communication devices of the telecommunication system.

Further, the complex value of the auto-correlation result at the auto-correlation peak position can be used to estimate the frequency offset. Ideally, the auto-correlation peak should correspond as accurate as possible to the timepoint of the last sample of the training sequence. The normalized output of the divider 14, i.e. the auto-correlation result is further used by the recognizing means 7 for recognizing the type of the received data burst.

It is to be noted, that the absolute value means 10 and the moving average means 11 as well as the divider 14 are optional and that an unnormalized signal can a used to detect the auto-corralation peak and recognize the type of a received data burst in the recognizing means 7. In this case, the output of the moving average means 13 is the auto-correlation result.

The delay value $D_{ac}$, by which the samples are delayed in the delay means 8, should satisfy the equation $D_{ac}=T/T_s$, whereby $T_s$ is the sampling rate of the telecommunication system. Further, the moving average window W should satisfy the equation $W=T \times (K-1)/T_s$. T is the duration of one symbol in the first and the second training sequence and K is the total number of symbols within the first and the second training sequence, respectively. Further, $f \leq \pm \frac{1}{4}T$ should be fulfilled, f being the maximum allowed frequency offset of the system.

Figure 5:
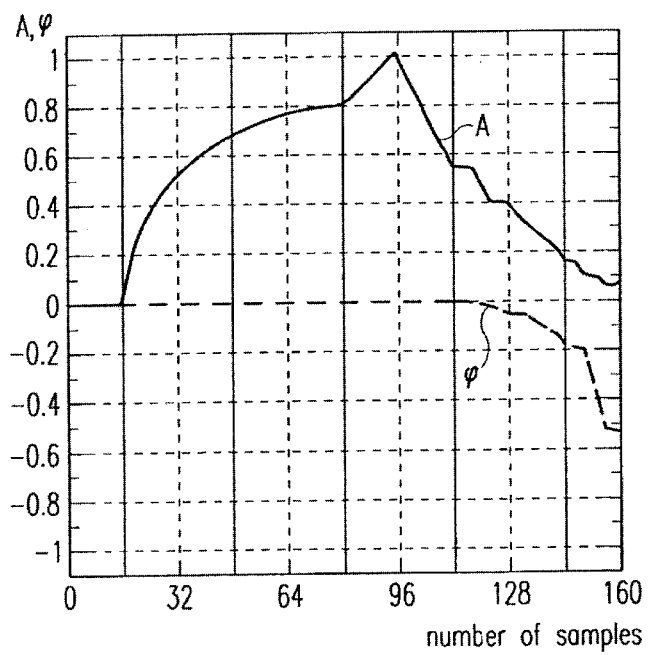
FIG. 5 shows an example of an auto-correlation result output from the auto-correlation means shown in FIG. 4 for a first training sequence according to the present invention.

In FIG. 5, an example for the output of the absolute value means 15 is shown. The diagram thereby shows the amplitude A in a solid line and the phase $\phi$ of the output of the absolute value means 15 in dashed lines. The horizontal axis is the number of the samples. The example shown in FIG. 5 is based on a first training sequence with $T/T_s=16$ and K=6. The auto-correlation peak can be seen at the last sample of the training sequence, i. e. sample number 96. For the example shown in FIG. 5, the above-explained equation $S_k(t)=S_{k-1}(t)$ is true. Thus, each symbol of the training sequence has the same shape and the same content of samples. As can be seen by the dashed line indicating the phase $\phi$, which is the phase of the output of the divider 14, remains zero during the entire training sequence and even beyond the auto-correlation peak.

Figure 6:
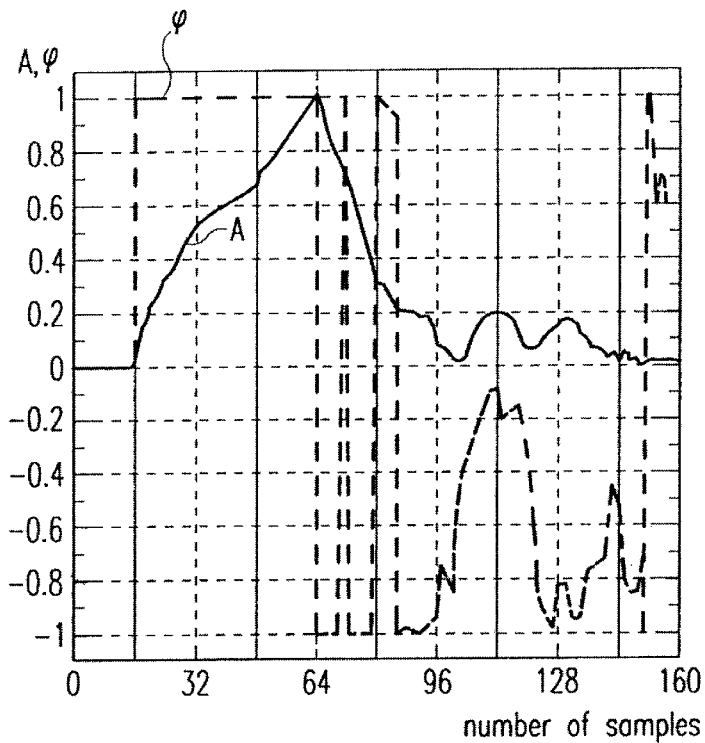
FIG. 6 shows an example of an output of the auto-correlation means shown in FIG. 4 for a second training sequence according to the present invention.

FIG. 6 shows the absolute value of the amplitude A and the phase $\phi$ of the output of the auto-correlation means 5 for the second training sequence, which satisfies the equation $S_k(t)=-S_{k-1}(t)$. In this case, each symbol of the training sequence is inverted in relation to the respective preceding symbol. The training sequence used in the example shown in FIG. 6 fulfills the parameters $T/T_s=16$ and K=4, so that the last sample of the training sequence is the sample number 64, at which the amplitude A shows the auto-correlation peak. The phase $\phi$ of the auto-correlation result at the auto-correlation peak or during the duration of the training sequence allows a clear distinction to the first training sequence shown in FIG. 5. In difference to the training sequence of the example shown in FIG. 5, in which the phase φ remains zero during the entire duration of the training sequence and beyond the auto-correlation peak, the phase φ of the training sequence of the example shown in FIG. 6, in which every symbol is inverted in relation to the preceding symbol shows a significantly different phase characteristic during the training sequence and at the end of the training sequence, i. e. at sample number 64. Thus, on the basis of the phase information of the auto-correlation result a clear distinction between the different training sequences and therefore between the different types of data bursts can be achieved. Thereby, the phase value of the auto-correlation result during the part of the training sequence before the auto-correlation peak or the phase value at the auto-correlation peak may be used for the distinction.

Figure 7:
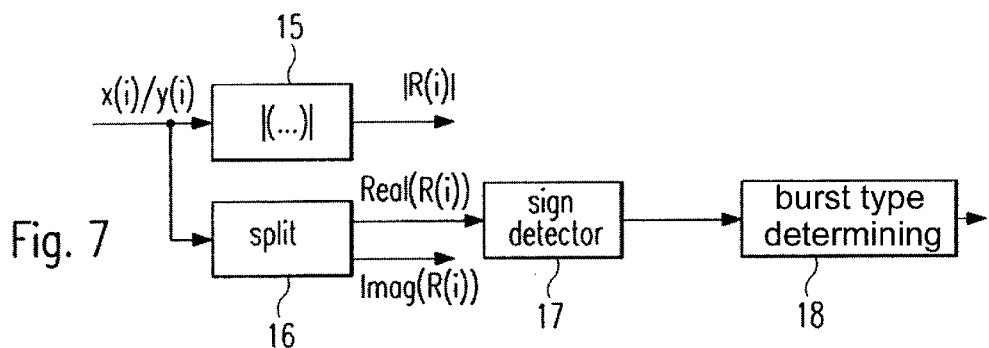
FIG. 7 shows a first example of a recognizing means, which can be used in a communication device according to the present invention.
Figure 8:
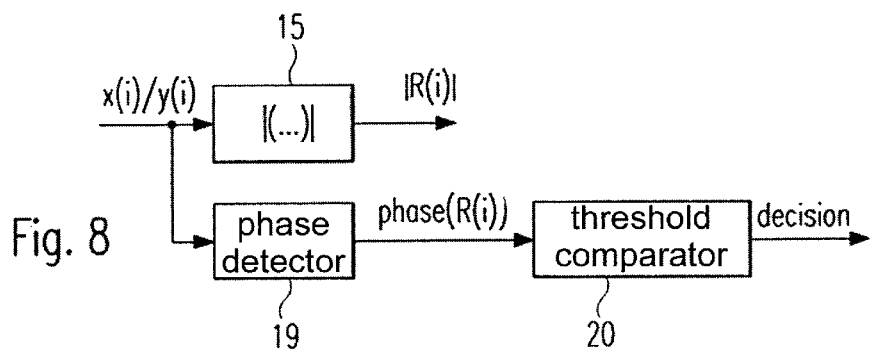
FIG. 8 shows a second example of a recognizing means, which can be used in a communication device according to the present invention.

In FIGS. 7 and 8, two examples of the recognizing means 7 for recognizing the type of a data burst on the basis of the phase value of the auto-correlation result of the training sequence are shown. In the example shown in FIG. 7, the recognizing means 7 comprises a splitting means 16 for splitting the auto-correlation result into a real part and an imaginary part, whereby the real part is supplied to a sign detector 17 for detecting the sign of the real part of the (normalized) auto-correlation result. Thereby, the sign detection of the real part of the auto-correlation result can be regarded as a simplified phase detection, since the sign value of the real part is positive in case that the absolute value of the phase of the real part is smaller or equal $\pi/2$ and the sign value of the real part of the auto-correlation output is negative if the absolute value of the real part of the auto-correlation result is smaller than $\pi$ but larger than $\pi/2$. The sign detector 17 therefore outputs the information that the real part of the auto-correlation result is positive or negative. This information is supplied to a means 18 for determining the type of the received data burst on the basis of the information from the sign detector 17 and to generate corresponding control information for further processing steps to be performed in the communication device 1. The structure of the recognizing means 7 shown in FIG. 7 is simple and easy to implement.

The example of the recognizing means 7 shown in FIG. 8 is more complex than the example shown in FIG. 7, since the recognizing means 7 of this example comprises means 19 for detecting the phase of the auto-correlation result of the training sequence and means for comparing the detected phase with a predetermined phase threshold to recognize the type of the received data burst. Thus, the phase of the auto-correlation result is accurately determined in the detecting means 19 and can e. g. also be used to determine a frequency offset for the data transmitted from another communication device. Thereby, the detecting means 19 can e.g. calculate the angle of the auto-correlation result and then calculate the phase value from the calculated angle.

As can be seen from the above, the present invention enables the use of very simple training sequences in data bursts of different types, whereby the training sequences of the different types can be constructed very similarly but still distinguishable on the receiver side, so that a distinction can be made between uplink and downlink traffic. Further, the auto-correlation means 5 which is used for detection of the auto-correlation peak for achieving synchronization is also used for distinguishing the different types of data bursts by means of its phase information. Thus, the reusability of the auto-correlation means 5 in base stations as well as in mobile terminals of the communication system provides an easy and cheap way of implementation.

What is claimed is:

1. Communication device for transmitting and receiving control and user data bursts in a digital telecommunication system, comprising:

receiving means for receiving data bursts including bursts of a first type and bursts of a second type different from said first type, said first type bursts respectively comprising a first training sequence and said second type bursts respectively comprising a second training sequence, correlation means for auto-correlating the data of received data bursts and outputting an auto-correlation result, and recognizing means for recognizing the type of a received data burst on the basis of a phase value of the auto-correlation result of the training sequence of said data burst.

2. Communication device for transmitting and receiving control and user data bursts in a digital telecommunication system according to claim 1, characterized in, that said recognizing means comprises means for detecting the phase value of the auto-correlation result of the training sequence.

3. Communication device for transmitting and receiving control and user data bursts in a digital telecommunication system according to claim 2, characterized in, that said recognizing means comprises means for comparing said detected phase value with a predetermined phase threshold to recognize the type of the received data burst.

4. Communication device for transmitting and receiving control and user data bursts in a digital telecommunication system according to claim 1, characterized in, that said recognizing means comprises means for detecting the sign value of the real part of the auto correlation result of the training sequence and means for determining the type of the received data burst on the basis of said sign value.

5. Communication device for transmitting and receiving control and user data bursts in a digital telecommunication system according to claim 1, characterized in, that in said first or said second training sequence every symbol is inverted in relation to the respective preceding symbol.

6. Communication device for transmitting and receiving control and user data bursts in a digital telecommunication system according to claim 5, characterized in, that all symbols of said first and second training sequence respectively consist of the same number of samples and have an identical absolute value.

7. Communication device for transmitting and receiving control and user data bursts in a digital telecommunication system according to one of the claims 1, characterized in, that said communication device is a mobile terminal of said telecommunication system, whereby said first type burst is a downlink data burst from a base station and said second type burst is an uplink data burst from another mobile terminal.

8. Method for distinguishing between data bursts of a first type transmitted from a first communication device and data bursts of a second type different from said first type transmitted from a second communication device in a digital telecommunication system, said first type bursts comprising a first training sequence and said second type bursts comprising a second training sequence, with the steps of receiving a data burst, auto-correlating the data of said received data burst and outputting an auto-correlation result, and recognizing the type of said received data burst on the basis of a phase value of the auto-correlation result of the training sequence of said data burst.

9. Method for distinguishing between data bursts according to claim 8, characterized in, that said recognizing step comprises the step of detecting the phase value of the autocorrelation result of the training sequence.

10. Method for distinguishing between data bursts according to claim 9, characterized in, that said recognizing step comprises the step of comparing said detected phase value with a predetermined phase threshold to recognize the type of the received data burst.

11. Method for distinguishing between data bursts according to claim 8, characterized in, that said recognizing step comprises the steps of detecting the sign value of the real part of the auto-correlation result of the training sequence and determining the type of the received data burst by means of said sign value.

12. Method for distinguishing between data bursts according to claim 8, characterized in, that in said first or said second training sequence every symbol is inverted in relation to the respective preceding symbol.

13. Method for distinguishing between data bursts according to claim 12, characterized in, that all symbols of said first and second training sequence respectively consist of the same number of samples and have an identical absolute value.

* * * * *